US012155946B2

(12) United States Patent
Hansen et al.

(10) Patent No.: US 12,155,946 B2
(45) Date of Patent: Nov. 26, 2024

(54) READOUT ADDRESSING VERIFICATION SYSTEMS AND METHODS

(71) Applicant: Teledyne FLIR Commercial Systems, Inc., Goleta, CA (US)

(72) Inventors: Randy J Hansen, Goleta, CA (US); Longxiang Jing, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 0 days.

(21) Appl. No.: 17/970,432

(22) Filed: Oct. 20, 2022

(65) Prior Publication Data

US 2023/0040963 A1     Feb. 9, 2023

Related U.S. Application Data

(63) Continuation of application No. PCT/US2021/030025, filed on Apr. 29, 2021.

(60) Provisional application No. 63/018,446, filed on Apr. 30, 2020, provisional application No. 63/031,383, filed on May 28, 2020.

(51) Int. Cl.
| H04N 25/74 | (2023.01) |
| H04N 25/50 | (2023.01) |
| H04N 25/75 | (2023.01) |
| H04N 25/77 | (2023.01) |

(52) U.S. Cl.
CPC .............. *H04N 25/74* (2023.01); *H04N 25/50* (2023.01); *H04N 25/75* (2023.01); *H04N 25/77* (2023.01)

(58) Field of Classification Search
CPC ........ H04N 5/33; H04N 17/002; H04N 25/50; H04N 25/60; H04N 25/74; H04N 25/75; H04N 25/77
See application file for complete search history.

(56) References Cited

U.S. PATENT DOCUMENTS

| 6,249,002 B1 | 6/2001 | Butler |
| 6,388,245 B1 | 5/2002 | Lee |
| 7,679,048 B1 * | 3/2010 | Aziz ................... G01J 5/02 |
| | | 250/252.1 |
| 8,953,047 B2 | 2/2015 | Martinussen |

(Continued)

FOREIGN PATENT DOCUMENTS

WO     WO 91/04498 A1     4/1991

*Primary Examiner* — Lin Ye
*Assistant Examiner* — Chriss S Yoder, III
(74) *Attorney, Agent, or Firm* — Haynes and Boone, LLP

(57) ABSTRACT

Techniques for facilitating readout addressing verification systems and methods are provided. In one example, an imaging device includes a focal plane array (FPA). The FPA includes a detector array. The detector array includes detectors. Each detector is configured to detect electromagnetic radiation. The FPA further includes a readout circuit configured to perform a readout to obtain image data from each of the detectors. The imaging device further includes a processing circuit. The processing circuit is configured to apply, to the FPA, a plurality of control signals associated with a readout of a subset of the detectors. The processing circuit is further configured to generate a verification value based on the plurality of control signals. The processing circuit is further configured to perform a verification of the plurality of control signals based at least on the verification value. Related methods and systems are also provided.

20 Claims, 7 Drawing Sheets

(56) References Cited

U.S. PATENT DOCUMENTS

| | | | |
|---|---|---|---|
| 9,161,028 B2 | 10/2015 | Solhusvik et al. | |
| 9,407,848 B2 | 8/2016 | Yaghmai | |
| 2013/0075584 A1* | 3/2013 | Yaghmai | H04N 17/002 250/208.1 |
| 2013/0083204 A1* | 4/2013 | Solhusvik | H04N 17/002 348/E17.002 |
| 2015/0288907 A1 | 10/2015 | Vampola et al. | |
| 2016/0295205 A1 | 10/2016 | Lim et al. | |
| 2019/0149758 A1 | 5/2019 | Nakamura | |
| 2019/0335118 A1 | 10/2019 | Simolon et al. | |
| 2020/0137323 A1 | 4/2020 | Sawada | |

* cited by examiner

READOUT ADDRESSING VERIFICATION SYSTEMS AND METHODS

CROSS-REFERENCE TO RELATED APPLICATIONS

This application is a continuation of International Patent Application No. PCT/US2021/030025 filed Apr. 29, 2021 and entitled "IMAGE SENSOR READOUT ADDRESSING VERIFICATION METHOD AND DEVICE" which claims priority to and the benefit of U.S. Provisional Patent Application No. 63/031,383 filed May 28, 2020 and entitled "READOUT ADDRESSING VERIFICATION SYSTEMS AND METHODS," and U.S. Provisional Patent Application No. 63/018,446 filed Apr. 30, 2020 and entitled "UNIT CELL SELECTION VERIFICATION SYSTEMS AND METHODS," all of which are incorporated herein by reference in their entirety.

TECHNICAL FIELD

One or more embodiments relate generally to imaging and more particularly, for example, to readout addressing verification systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an imaging device includes a focal plane array. The focal plane array includes a detector array. The detector array includes a plurality of detectors, where each detector is configured to detect electromagnetic radiation. The focal plane array further includes a readout circuit configured to perform a readout to obtain image data from each of the plurality of detectors. The imaging device further includes a processing circuit. The processing circuit is configured to apply, to the focal plane array, a plurality of control signals associated with a readout of a subset of detectors of the plurality of detectors. The processing circuit is further configured to generate a verification value based on the plurality of control signals. The processing circuit is further configured to perform a verification of the plurality of control signals based at least on the verification value.

In one or more embodiments, a method includes detecting, by each detector of a plurality of detectors of a focal plane array, electromagnetic radiation. The method further includes applying, to the focal plane array, a plurality of control signals associated with addressing a subset of detectors of the plurality of detectors. The method further includes generating a verification value based on the plurality of control signals. The method further includes performing a verification of the plurality of control signals based at least on the verification value.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
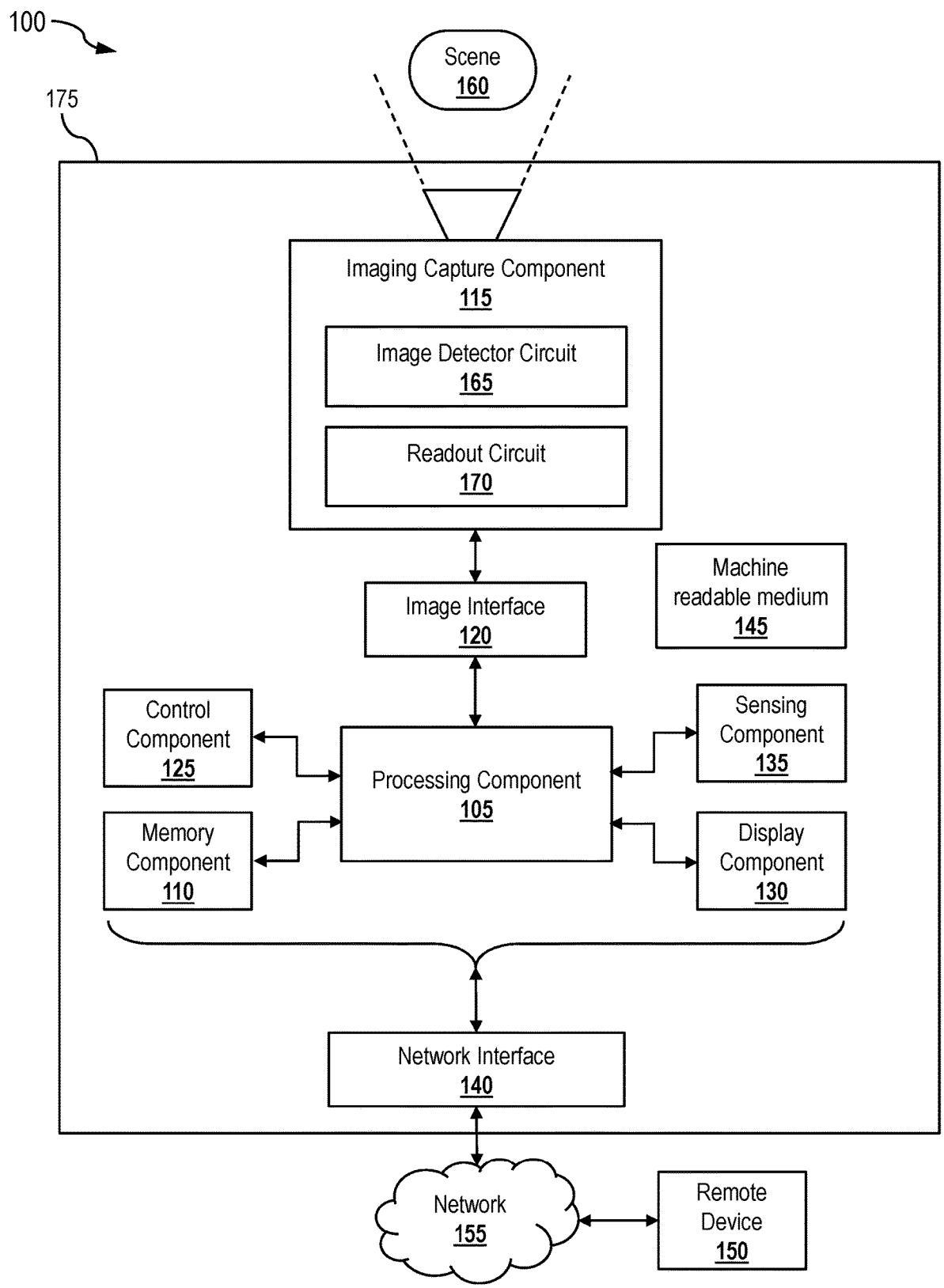
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate readout addressing verification systems and methods. In some embodiments, a unit cell of a unit cell array includes a detector and selection circuitry associated with the detector. The unit cell array thus includes a detector array formed of detectors (e.g., also referred to as detector pixels, detector elements, or simply pixels) and a portion of a selection circuit. Selection circuitry associated with a detector is a portion of the selection circuit. Each detector pixel detects image data associated with components of incident EM radiation and generates detection signals (e.g., electrical signals) indicative of the detected image data. The signals may include photocurrent generated by the detector element in response to incident EM radiation.

Readout of these detection signals by a readout circuit involves selecting/addressing the unit cells (e.g., selection of the detectors). For example, the unit cells may be selected row by row to allow readout of the unit cells row by row. In some embodiments, the selection circuitry associated with a given unit cell may include switches. Each switch of the unit cell may be controlled using a corresponding control signal. The switches may be appropriately turned on (e.g., closed) and turned off (e.g., open) to bias the detector, capture data from the associated detector, and provide the data to the readout circuit. In some aspects, the switches may be implemented using transistors. In one example, a unit cell has three transistors, with a state (e.g., on or off state) of each transistor being based on a control signal applied to the transistor. The selection circuit may be considered an interface between the detectors and the readout circuit, since the selection circuit selectively couples the detectors to the readout circuit. As such, the selection circuitry may also be referred to as an interface circuitry. In other aspects, the selection circuitry may be considered a part of the readout circuit.

During an imaging operation (e.g., also referred to as a normal operation) of the unit cell array, a combination of states for the switches of the unit cells are controlled (e.g., turned on or off) according to a normal operation signal pattern sequence (e.g., also referred to as a normal signal pattern sequence). For a given instance in time during the imaging operation, the normal signal pattern sequence may indicate a digital state (e.g., 1 or 0) and/or an analog level (e.g., logic high voltage level or logic low voltage level) of each control signal. In this regard, the control signals may refer to analog signals (e.g., having logic high voltage level or logic low voltage level) that turn on or turn off the switches or may refer to digital signals (e.g., having binary value 1 or 0) to be driven or otherwise used to drive the analog signals to turn on or turn off the switches. The imaging operation of the unit cell array may refer to detection of radiation to generate detection signals followed by readout of these detection signals. In an aspect, the unit cells of the unit cell array may be addressed one subset at a time, such as addressed row by row. When the unit cell array is addressed row by row, the normal signal pattern sequence may define time periods associated with addressing each row of unit cells. It is noted that the column and row terminology may be interchangeable, depending upon the application. In some cases, a line may be a general term used to refer to a row or a column.

In some embodiments, readout addressing verification may be performed to verify the control signals used to address the unit cells during the imaging operation of the unit cell array. The control signals may be verified to determine whether a correct subset of unit cells is addressed at a given time (e.g., according to a system clock and/or synchronization signal) and that at the given time one, and only one, subset of unit cells is addressed. In some aspects, such verification is performed without disrupting the imaging operation unless one or more errors associated with addressing the unit cell array are detected. In some aspects, the control signals may be monitored and verified in real time or near real time with readout of image data from the addressed unit cells (e.g., image data from the detectors associated with the addressed unit cells). Such monitoring/verification in real time or near real time may be referred to as live monitoring/verification of the control signals. In some cases, the control signals that are monitored/verified may be digital control signals close to an analog signal chain used to address the unit cells. In this regard, a verification can be made as to whether the analog signal chain received the control signals properly. In such cases, signal integrity is verified at the point the control signals are received rather than the point that the control signals are generated.

Thus, an integrity of addressed data may be verified through verification of the control signals. For example, a readout circuit equipped with and/or coupled to readout addressing verification capability may increase a functional safety setting. Such readout addressing verification capability may be implemented to allow failures of data integrity to be detected and flagged within a time frame appropriate for various applications, such as functional safety and automotive applications. Various embodiments address safety concerns that the image data output from the readout circuit is a correct image in time and that each subset (e.g., row) of unit cells of the unit cell array is addressed correctly for readout through verification of, for example, a row order and a state of signal addressing of the unit cell array using the control signals.

Various embodiments of methods and systems disclosed herein may be included in or implemented as various devices and systems such as visible-light imaging systems, infrared imaging systems, imaging systems having visible-light and infrared imaging capability, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 (e.g., an infrared camera) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 175 in FIG. 1 may represent a housing of the imaging system 100. The housing may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, 140, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, video analytics, etc.).

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. The processing component 105 and/or the image interface 120 may be configured to store in the memory component 110 images or digital image data captured by the imaging capture component 115. The processing component 105 may be configured to store processed still and/or video images in the memory component 110.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes an image detector circuit 165 (e.g., a thermal infrared detector circuit) and a readout circuit 170 (e.g., an ROIC). In some cases, the image capture component 115 does not have a shutter, such that the image detector circuit 165 is exposed to a scene encompassed by a field of view of the image capture component 115. For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) short-wave IR (SWIR) radiation, mid-wave IR (MWIR) radiation (e.g., EM radiation with wavelength of 2 µm to 5 µm), and/or long-wave IR (LWIR) radiation (e.g., EM radiation with wavelength of 7 µm to 14 µm), or any desired IR wavelengths (e.g., generally in the 0.7 µm to 14 µm range). In other aspects, the image detector circuit 165 may capture radiation from one or more other wavebands of the EM spectrum, such as visible-light, ultraviolet light, and so forth.

The image detector circuit 165 may capture image data associated with the scene 160. To capture the image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the imaging capture component 115 may include one or more filters adapted to pass radiation of some wavelengths but substantially block radiation of other wavelengths. For example, the imaging capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the imaging capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may include an IR imaging sensor having an FPA of detectors responsive to IR radiation including near infrared (NIR), short-wave IR (SWIR), MWIR, long-wave IR (LWIR), and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

Other imaging sensors that may be embodied in the image capture component 115 include a photonic mixer device (PMD) imaging sensor or other time of flight (ToF) imaging sensor, light detection and ranging (LIDAR) imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

In some embodiments, the image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2:
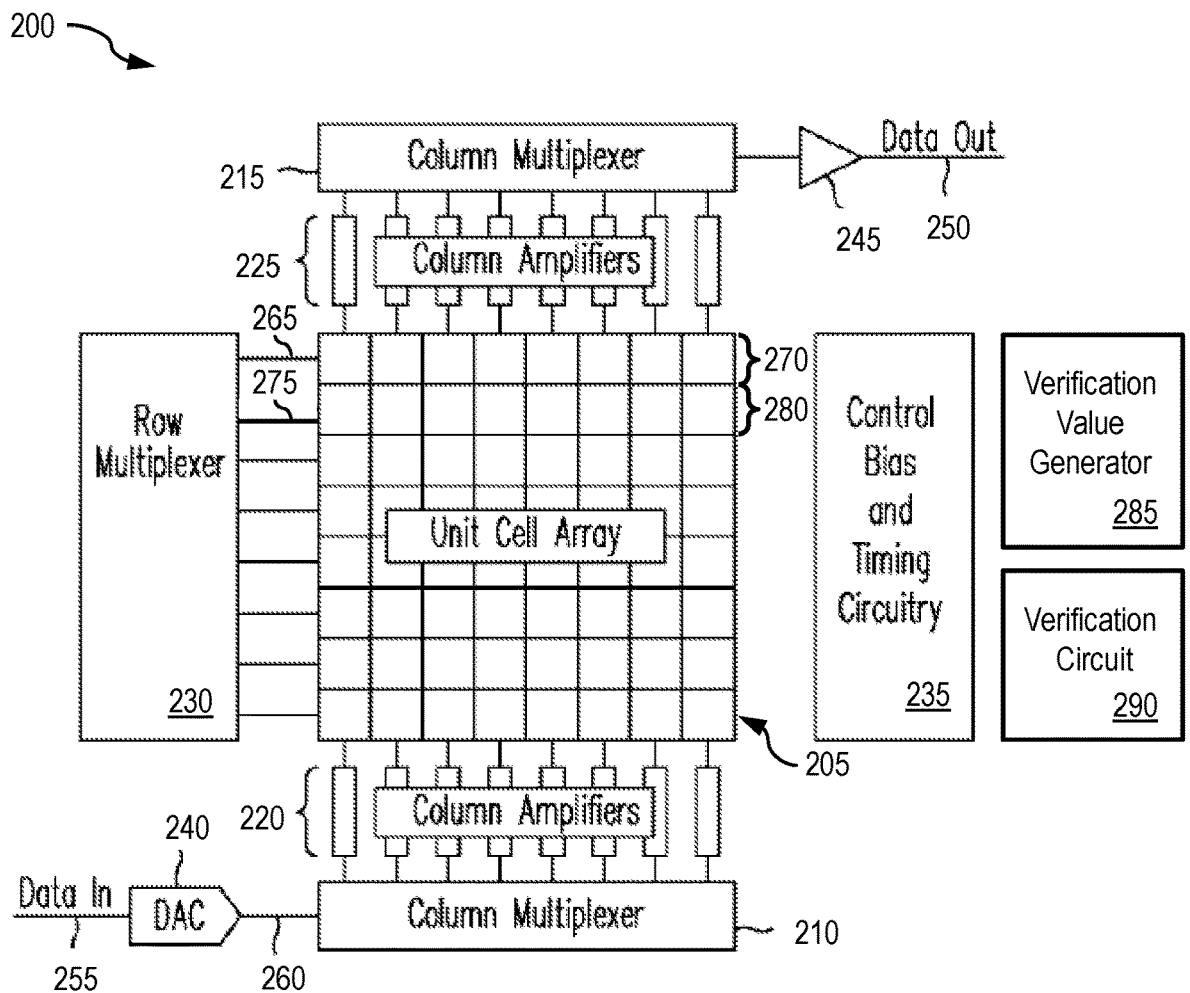
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the imaging capture component 115 of FIG. 1.

The image sensor assembly 200 includes a unit cell array 205, column multiplexers 210 and 215, column amplifiers 220 and 225, a row multiplexer 230, control bias and timing circuitry 235, a verification value generator 285, a verification circuit 290, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. In some cases, the verification circuit 290 may receive data provided on the data output line 250. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In an embodiment, components of the image sensor assembly 200 may be implemented such that the unit cell array 205 is hybridized to (e.g., bonded to, joined to, mated to) the ROIC. An example of such a hybridization is described with respect to FIG. 3.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells. In an aspect, the control bias and timing circuitry 235 may be, may include, or may be a part of, a logic circuit.

In an aspect, the control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 105 and/or imaging capture component 115 of FIG. 1.

In some embodiments, the control bias and timing circuitry 235 may generate control signals for addressing the unit cell array 205 (e.g., to turn on or turn off switches of a selection circuit) to allow access to and readout of image data from an addressed portion of the unit cell array 205. In such embodiments, the control bias and timing circuitry 235 may include and/or may be referred to as a control signal generator. For explanatory purposes, the unit cell array 205 may be addressed to access and readout image data from the unit cell array 205 row by row, although in other implementations the unit cell array 205 may be addressed column by column or via other manners. In such cases that the unit cell array 205 is addressed row by row, the control signals are appropriately set to address one row of the unit cell array 205 while not addressing any other row of the unit cell array 205. In this regard, the control signals follow a normal signal pattern sequence for addressing the unit cell array 205 row by row. In some cases, the control signals may be digital control signals (e.g., bits) used to derive appropriate signal levels (e.g., an appropriate logic high voltage level or appropriate logic low voltage level) to cause switches of a selection circuit to turn on or turn off. Such appropriate signal levels may be generated by driver circuits of the unit cell array 205 for example. In other cases, the control signals may be analog signals that are at the appropriate signal levels to cause switches of a selection circuit to turn on or turn off.

In some embodiments, addressing of the unit cell array 205 row by row may be facilitated through use of appropriate LSYNC signals (e.g., also referred to as row synchronization signals in this row by row example) and clock signals. In some cases, an LSYNC signal may indicate a start of a line. In some cases, such line synchronization signals and/or clock signals may be provided by the bias control and timing circuitry 235. Each row of the unit cell array 205 may be associated with a corresponding LSYNC signal that can be provided to various components of the image sensor assembly 200 to facilitate synchronization of these various components. Each LSYNC signal may be associated with a signature. For example, an LSYNC signal having a signature of "001" may be associated with a row 270 of the unit cell array 205, an LSYNC signal having a signature of "002" may be associated with a row 280 of the unit cell array 205, and so forth. In some cases, the LSYNC signals may have non-numerical signatures, non-textual signatures, and/or other formats. Such signatures may be of arbitrary values and/or formats and used simply to differentiate between different lines of the unit cell array 205.

Each row of the unit cell array 205 may be addressed using a control signal(s) from the row multiplexer 230. An example implementation in which each row of a unit cell array is addressed using three control signals is described with respect to FIGS. 4 and 5. In some cases, the row multiplexer 230 may receive the control signal(s) from the control bias and timing circuitry 235. The row multiplexer 230 may provide the control signals as digital control signals or analog control signals depending on implementation. Although FIG. 2 illustrates a single line from the row multiplexer 230 to each row of the unit cell array 205, such as a single control line 265 associated with the row 270 of the unit cell array 205 and a signal control line 275 associated with the row 280, each single line in FIG. 2 may represent multiple control lines. Each of these multiple lines may be associated with a control signal and may be referred to as a row addressing line. In some aspects, the control lines (e.g., the control lines 265 and 275) may be digital control lines to provide digital control signals to the rows of the unit cell array 205. The unit cell array 205 may include, or may be coupled to, appropriate circuitry to generate analog signals of appropriate voltage levels to turn on or off associated switches for addressing the rows of the unit cell array 205. In other aspects, the control lines (e.g., the control lines 265 and 275) may be analog control lines to provide analog signals of appropriate voltage levels (e.g., to turn on or off associated switches) for addressing the rows of the unit cell array 205.

The verification value generator 285 may generate a verification value (e.g., also referred to as a verification code) based on the control signals. In some cases, the verification value may be of a digital format and may be referred to as verification bits. In an aspect, the verification value may be a cyclic redundancy check (CRC) code and the verification value generator 285 may be referred to as a CRC circuit. In an aspect, the verification value generator 285 may obtain the control signals by sampling control lines (e.g., the control lines 265 for the row 270, the control lines 275 for the row 280, and control lines for other rows of the unit cell array 205). In one implementation, the sampled control signals are digital control signals (e.g., digital control bits). In another implementation, the sampled control signals are analog control signals.

A verification value may be generated for each addressing time period associated with the unit cell array 205. In an aspect, an addressing time period (e.g., also referred to as an addressing time or addressing period) may refer to a time period associated with addressing a subset of the unit cell array 205. In this aspect, a line addressing time period may refer to a time period associated with addressing a line (e.g., a row or a column depending on implementation) of the unit cell array 205. In some cases, each verification value may be associated with a respective LSYNC signal. In one example, the unit cell array 205 may have 518 rows (e.g., 512 rows of active unit cells and 6 rows of reference unit cells). A verification value can be generated in response to addressing each of the 518 rows, such that each frame is associated with 518 verification values. For a row addressing time period associated with a certain row of the unit cell array 205, the control signals include control signals to address this certain row as well as control signals to not address the remaining rows of the unit cell array 205.

The verification circuit 290 may verify the control signals based at least on the verification value. For a given addressing time period, the verification circuit 290 may verify the control signals to determine whether a desired subset (e.g., desired row) of unit cells of the unit cell array 205 is addressed. In an embodiment, such a determination also involves determining whether the remaining subsets (e.g., all other rows) of unit cells of the unit cell array 205 are not addressed (e.g., the control signals are at appropriate states/levels to not address these remaining subsets). In such an embodiment, the verification circuit 290 determines whether one, and only one, subset (e.g., row) of unit cells is being addressed. As such, the verification value generator 285 and the verification circuit 290 may be collectively referred to as readout addressing verification circuitry. In an embodiment, the verification value generator 285 and the verification circuit 290 may be implemented using one or more processing circuits on a single chip or distributed across two or more chips.

To verify the control signals for the given addressing time period, the verification circuit 290 may compare the verification value to a predetermined value (e.g., an expected value) associated with the given addressing time period. For example, when LSYNC signals are used to facilitate synchronization, the verification circuit 290 may compare a verification value associated with a certain LSYNC signal with a predetermined value associated with the same LSYNC signal. As an example, consider that the row 270 is to be addressed at a certain time instance (e.g., according to a system clock). The predetermined value to be used for comparison by the verification circuit 290 around this time instance is the predetermined value associated with addressing the row 270. Each addressing time period (e.g., or similarly, in some cases, each LSYNC signal) has an associated predetermined value generated based on the control signals as provided in a normal signal pattern sequence. As such, a deviation of the verification value from the predetermined value may be indicative of a deviation of a present signal pattern sequence applied to the unit cell array 205 from the normal signal pattern sequence and is thus an error in the addressing of the unit cell array 205. As an example, an error is present when the verification value generated based on addressing a first row does not match the predetermined value (e.g., expected value) associated with addressing the first row. In an aspect, the predetermined value for each addressable subset (e.g., each addressable row) of the unit cell array 205 may be generated in the field (e.g., based on the normal signal pattern sequence) and/or in a factory and stored (e.g., in the memory component 110). In some cases, the predetermined value (e.g., predetermined CRC code) for each addressable subset may be provided as a look-up table.

In some aspects, the verification circuit 290 may receive the verification values as part of the data output line 250 or other ROIC output. For example, a data stream (e.g., bit stream) associated with a readout of the row 270 may include an output (e.g., image pixel data) from unit cells of the row 270 and a verification value (e.g., an output CRC code) associated with addressing the row 270. A readout of the row 280 may then follow. In other aspects, the verification circuit 290 may receive the verification values from the verification value generator 285. In some cases, the verification circuit 290 may be off chip from the unit cell array 205 and/or the ROIC and used to perform an off chip comparison of the verification value generated by the verification value generator 285 for an addressed row with the corresponding predetermined value associated with that addressed row. In an aspect, the verification circuit 290 may be off chip to save space and/or simplify design, such as in cases where an on-chip verification circuit may need an on-chip memory to store the predetermined values.

The verification circuit 290 may be capable of providing alerts that simply indicate a presence of a possible error state. Alternatively or in addition, the verification circuit 290 may be capable of providing alerts that more specifically characterize an error. As one example, if the verification value generated by the verification value generator 285 matches the predetermined value associated with addressing the row 280 rather than the row 270, the verification circuit 290 may provide an error state to a user indicating that a timing associated with the image sensor assembly 200 may be off by one row. As another example, if the verification value generated by the verification value generator 285 for a given row does not match a predetermined value associated with addressing any row of the unit cell array 205, the verification circuit 290 may indicate that the control signals for addressing the row are incorrect.

Thus, using various embodiments, control signals for addressing a unit cell array may be monitored/verified by generating verification values and comparing them with corresponding predetermined values. Depending on implementation, the control signals may be digital control signals (e.g., control bits) or analog control signals. As an example, an implementation in which control signals denoted as $EN_0$ through $EN_N$, $BS_1$ through $BS_N$, and $SEL_1$ through $SEL_N$ are used to address a unit cell array and monitored/verified during such addressing is described with respect at least to FIGS. 4 and 5. Such monitoring/verifying may involve determining that a correct subset of detectors is addressed at a given time (e.g., according to a system clock and/or synchronization signal) and that at the given time one, and only one, subset of detectors is addressed. As an example, at a certain time instance (e.g., a time at which control signals are sampled) when a third row of the unit cell array 205 is expected to be addressed, the monitoring/verifying may involve determining that the third row is indeed addressed and that no other rows of detectors are addressed. Addressing of an incorrect row and/or addressing of multiple rows simultaneously may adversely affect (e.g., corrupt) the image data read out from the unit cell array 205 and thus an image generated based on the image data.

In some embodiments, the monitoring/verifying of control signals can be performed in real time by generating the verification values and comparing them with the corresponding predetermined values as the subsets (e.g., rows) of unit cells are addressed. In some aspects of such embodiments, the verification value may be generated within the corresponding addressing time period or soon afterwards. Such monitoring/verification may be referred to as live monitoring/verification. In an embodiment, such monitoring/verification may allow a determination of whether a row that is being addressed and output is the correct row and help ensure that the image data has not been corrupted by a failure of the control signals that address the unit cell array 205.

In some aspects, a user of the image sensor assembly 200 (e.g., a camera including the image sensor assembly 200) may be alerted of an error associated with addressing the unit cell array 205, such that the user may troubleshoot and/or perform mitigation actions. As non-limiting examples, mitigation actions may include resetting the image sensor assembly 200 (e.g., a system including the image sensor assembly 200), cycling power associated with the image sensor assembly 200 (or portion thereof) to determine if the error is a transient fault, or replace the image sensor assembly 200 (e.g., replace the camera with a different camera). The verification circuit 290 may alert the user and/or cause another component to alert the user. An error state may be communicated to the user via, by way of non-limiting examples, a display on a user device (e.g., mobile phone), a display on a camera that includes the image sensor assembly 200, and/or via other manners. Such an alert may be a visible alert, such as text or pulses of light emitted by light emitting diodes communicatively coupled to the verification circuit 290, and/or an audible alert, such as beeping by a speaker communicatively coupled to the verification circuit 290. In some cases, the user is alerted wherever an error associated with addressing the unit cell array 205 is detected. In some cases, the user is not alerted of an error(s) associated with addressing the unit cell array 205 unless at least a threshold number of addressing errors is detected. In some cases, an imaging operation of the image sensor assembly 200 may be stopped in response to a single detected error state and resumed when instructed by the user. In some cases, an imaging operation of the image sensor assembly 200 may be stopped only after a threshold number of errors is detected and resumed when instructed by the user. In some cases, whether and how an imaging system responds to a detected error, such as whether to alert the user of an error(s) and/or stop imaging operation of the image sensor assembly 200, may be based on application (e.g., application-specific safety requirements), manufacturer preferences, user preferences, and/or other considerations.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

It is noted that the various components of FIG. 2 may be implemented on a single chip or multiple chips. Furthermore, while the various components are illustrated as a set of individual blocks, various of the blocks may be merged together or various blocks shown in FIG. 2 may be separated into separate blocks. As a non-limiting example, in some cases, functionality of the verification circuit 290 provided above may be implemented at least in part by the column amplifiers 225. In some cases, the verification circuit 290 may be off chip from other components of the readout circuit. The off chip circuitry may be used to compare a verification value, which may be generated on chip, to a predetermined value.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

In some aspects, the unit cell array 205 may include active unit cells and, optionally, reference unit cells. Each active unit cell may include a detector that captures a portion of an incident scene and generate an associated output signal. Each reference unit cells may include a detector and a structure (e.g., lid, cover) that blocks the detector from the scene that is incident on the active unit cells. In this regard, a reference unit cell and its detector may be referred to as a blind unit cell and a blind detector, respectively. The reference unit cells may capture a value (e.g., an absolute value) of a temperature pedestal that is incident on the active unit cells and the reference unit cells. In an aspect, the temperature pedestal may also be referred to as a temperature offset, an ambient temperature pedestal, or an ambient temperature offset. In some cases, by removing the temperature pedestal, nonlinearities associated with some residual current that gets shunted away and not integrated at the integration capacitor may be corrected.

For example, an FPA (e.g., 100) may include 2048×2048 active unit cells, with 2048×20 reference unit cells positioned in proximity to the FPA. The reference unit cells may be around, along the side, or generally positioned relative to the active unit cells such that an ambient temperature experienced by the reference unit cells is equal or substantially equal to an ambient temperature experienced by the active unit cells. In some cases, the reference unit cells may be in the same rows and/or columns as the active unit cells. In some cases, the reference unit cells may be additional columns adjacent to the active unit cells. In some cases, the reference unit cells may be additional rows adjacent to the active unit cells. For examples, when the reference unit cells are additional rows and the unit cell array 205 is addressed/readout row by row, the control signals are provided to address (or not address) the row of reference unit cells. In some cases, at least one of the reference unit cells may not share a row and/or a column with any active unit cells. In various embodiments, readout addressing verification follows the same procedure for active unit cells and reference unit cells. In this regard, addressing of the unit cell array is generally not dependent on whether an addressed line includes only active unit cells, only reference unit cells, or both active unit cells and reference unit cells.

Figure 3:
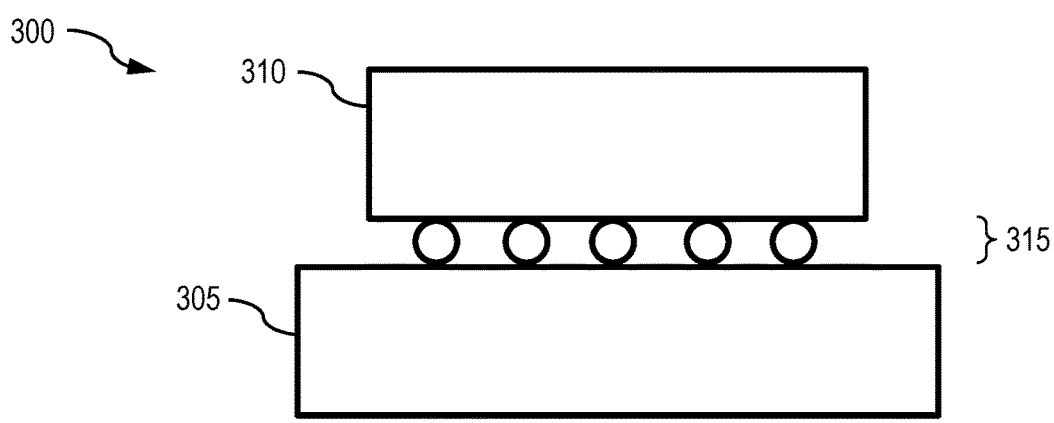
FIG. 3 illustrates an example image sensor assembly in accordance with one or more embodiments of the present disclosure.

In an embodiment, components of the image sensor assembly 200 may be implemented such that a detector array is hybridized to (e.g., bonded to) a readout circuit. For example, FIG. 3 illustrates an example image sensor assembly 300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 300 may be, may include, or may be a part of the image sensor assembly 200.

The image sensor assembly 300 includes a device wafer 305, a readout circuit 310, and contacts 315 to bond (e.g., mechanically and electrically bond) the device wafer 305 to the readout circuit 310. The device wafer 305 may include detectors (e.g., the unit cell array 205). The contacts 315 may bond the detectors of the device wafer 305 and the readout circuit 310. The contacts 315 may include conductive contacts of the detectors of the device wafer 305, conductive contacts of the readout circuit 310, and/or metallic bonds between the conductive contacts of the detectors and the conductive contacts of the readout circuit 310. In one embodiment, the device wafer 305 may be bump-bonded to the readout circuit 310 using bonding bumps (e.g., indium bumps). The bonding bumps may be formed on the device wafer 305 and/or the readout circuit 310 to allow connection between the device wafer 305 and the readout circuit 310. In an aspect, hybridizing the device wafer 305 to the readout circuit 310 may refer to bonding the device wafer 305 (e.g., the detectors of the device wafer 305) to the readout circuit 310 to mechanically and electrically bond the device wafer 305 and the readout circuit 310.

Figure 4:
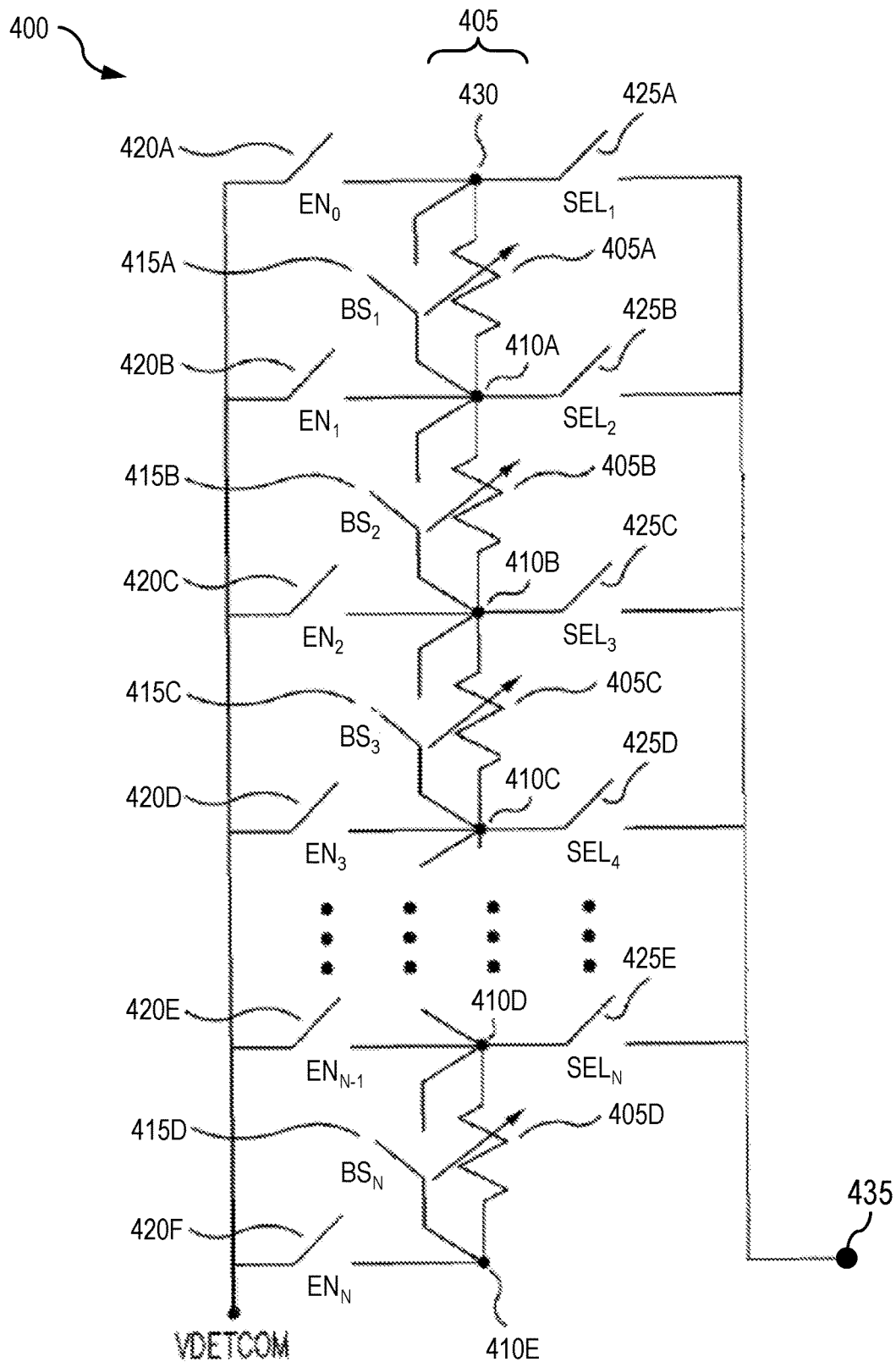
FIG. 4 illustrates a circuit that includes a detector string and an associated selection circuitry in accordance with one or more embodiments of the present disclosure.

FIG. 4 illustrates a circuit 400 that includes a detector string 405 and an associated selection circuitry in accordance with one or more embodiments of the present disclosure. The circuit 400 is described with reference to FIG. 5, which illustrates an example timing diagram 500 for the selection circuit of FIG. 4 for facilitating readout of the detector string 405 (e.g., a detector array that includes the detector string 405) in accordance with one or more embodiments of the present disclosure. In an embodiment, a unit cell of the unit cell array 205 includes a detector of the detector string 405 and a portion of the selection circuit (e.g., also referred to as an interface circuit) associated with the detector.

The detector string 405 of the circuit 400 includes detectors 405A-D (e.g., infrared sensors). Each of contacts 410A-E is shared by detectors of the detector string 405. For example, the detectors 405A and 405B share the contact 410A, and the detectors 405B and 405C share the contact 410B. By sharing contacts, the number of contacts for the detector is reduced and, consequently, the amount of area needed for contacts is reduced. In an embodiment, the detector string 405 may be, or may be a part of, a row or a column in an array of detectors. In some cases, the contacts 410A-E may be shared between adjacent columns or rows (e.g., also referred to as neighboring columns or rows) of the array. It is noted that reference to a column or a row may include a partial column or a partial row and that the column and row terminology may be interchangeable, depending upon the application. In some cases, a line may be a general term used to refer to a row or a column. For explanatory purposes, the detector string 405 is a column (or portion thereof) of the array, and each of the detectors 405A-D is part of a different row of the array. In this regard, the detectors string 405 has N rows. Ellipses between the detectors 405C and 405D indicate that one or more additional detectors are present between the detectors 405C and 405D or no detectors are present between the detectors 405C and 405D. The number of columns and rows of a detector array may vary, depending for example on a desired application, with the circuit 400 replicated to form the desired number of additional columns. Although the detector array is represented as variable resistors and may be a microbolometer array, other types of detectors may be utilized.

The selection circuit of the circuit 400 includes switches 415A-D, switches 420A-F, and switches 425A-E. In some embodiments, the switches 415A-D, the switches 420A-F, and/or the switches 425A-F may be implemented using transistors. The switches 415A-D are in parallel with the detectors 405A-D. In FIG. 4, each of the switches 415A-D, the switches 420A-F, and the switches 425A-E is controlled by a control signal depicted adjacent to the associated switch. For example, a control signal $BS_3$ can be asserted to turn on (e.g., close) and deasserted to turn off (e.g., open) the switch 415C, a control signal $EN_{N-1}$ can be asserted to turn on and deasserted to turn off the switch 420E, a control signal $SEL_1$ can be asserted to turn on and deasserted to turn off the switch 425A, and so forth. In an aspect, the control signals (e.g., with appropriate timing) may be provided to the selection circuit by a readout circuit (e.g., the readout circuit 170) and/or a processing circuit (e.g., the processing component 105). With reference to FIG. 2, for the row 270 of the unit cell array 205, the row multiplexer 230 may provide the control signals on the line(s) 265. For example, if the row 270 includes the detector 405A, the control signals provided on the line(s) 265 may include $BS_1$, $EN_1$, and $SEL_1$. For explanatory purposes, in FIGS. 4 and 5, each of the switches (e.g., 415A-D, 420A-F, and 425A-E) turns on in response to a logic high control signal and turns off in response to a logic low signal. However, depending on type of switching technology utilized, a switch may turn off in response to a logic high control signal and turn on in response to a logic low control signal.

Control signals $BS_1$ through $BS_N$ are used to control the switches 415A-D to selectively short the detectors 405A-D. As such, the switches 415A-D may be referred to as bolometer short (BS) switches. In some cases, the switches 415A-D are used to isolate their respective detectors 405A-D. Such isolation may reduce parasitic capacitances and/or resolve performance issues. In some cases, by controlling the on/off state of the switches 415A-D and applying appropriate timing (e.g., as discussed with reference to FIG. 5), a reduced sensitivity to defects (e.g., column-to-column short defect) may be provided, which may result in less noise, less crosstalk, and/or reduced parasitic capacitance within the FPA.

Figure 5:
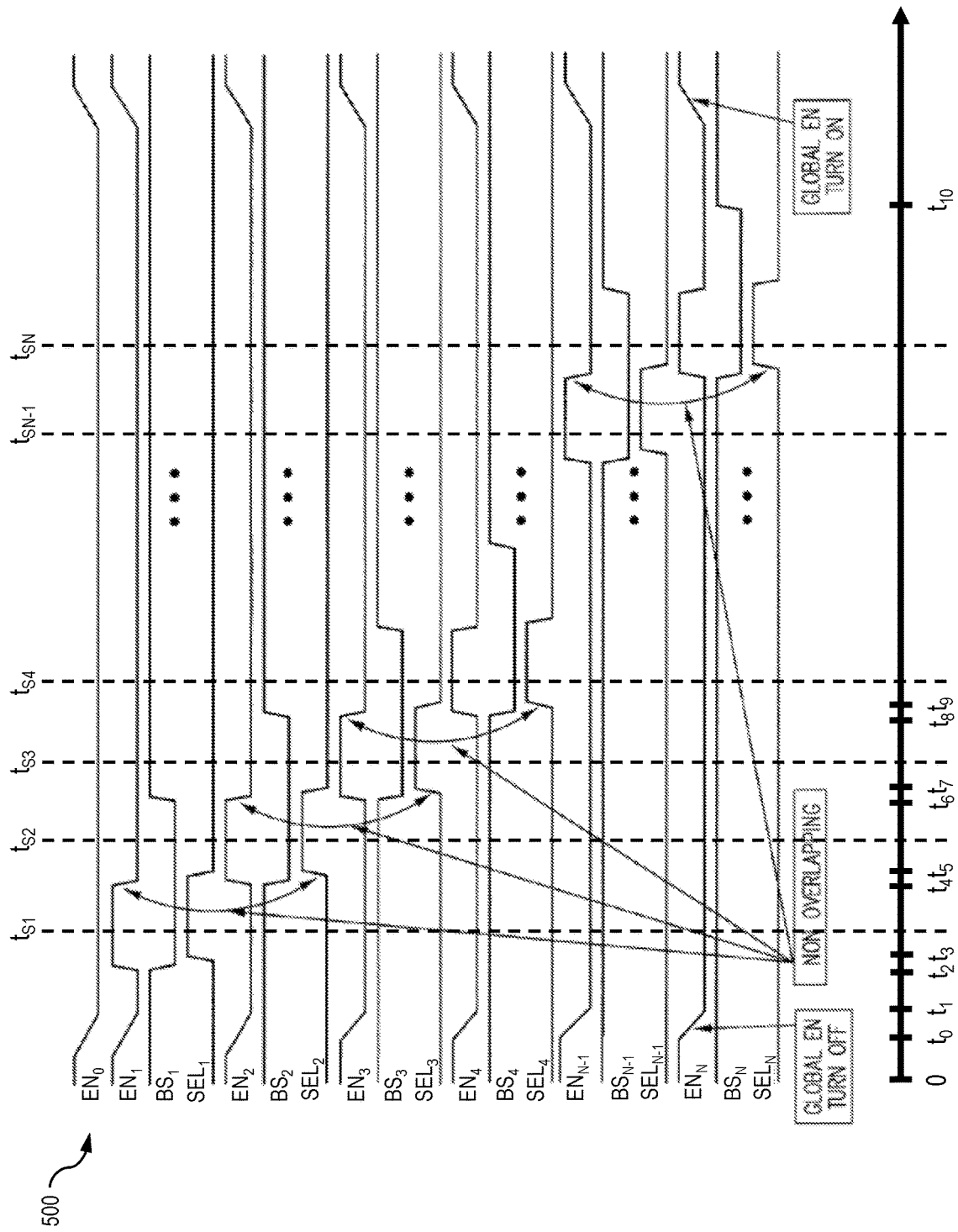
FIG. 5 illustrates an example timing diagram for the selection circuitry of FIG. 4 in accordance with one or more embodiments of the present disclosure.

Control signals $EN_0$ through $EN_N$ are used to control the corresponding switches 420A-F. The switches 420A-F selectively couple the detectors 405A-D to a bias signal $V_{DETCOM}$ (e.g., also referred to as a reference voltage). Control signals $SEL_1$ through $SEL_N$ may be used to control the corresponding switches 425A-D. The switches 425A-D selectively couple the detectors 405A-D to a node 435. The node 435 may be connected the ROIC, such that the switches 425A-D selectively couple the detectors 405A-D to the ROIC. For example, if the control signal $SEL_1$ is asserted, the switch 425A is closed (e.g., turned on) and the detector 405A provides a signal (e.g., indicative of radiation received by the detector 405A) to the ROIC. In a similar manner, the detectors 405A-D may be selected, for example, row by row in a sequential fashion using their respective set of control signals. The control signals $EN_0$ through $EN_N$ and $SEL_1$ through $SEL_N$ may be collectively set to control corresponding switches 420A-F and 425A-E for selecting/addressing the row, while the control signals $BS_1$ through $BS_N$ are used to control the corresponding switches 415A-D (e.g., for isolation purposes). As such, the control signals may be referred to as column/row select signals, column/row address signals, or address signals. In some cases, the control signals $EN_0$ through $EN_N$, $SEL_1$ through $SEL_N$, and $BS_1$ through $BS_N$ may represent digital signals that are used to generate corresponding analog signals appropriate to drive the corresponding switches. In other cases, the control signals $EN_0$ through $EN_N$, $SEL_1$ through $SEL_N$, and $BS_1$ through $BS_N$ may represent the analog signals appropriate to drive the corresponding switches. While FIGS. 4 and 5 illustrate an embodiment in which three control signals are used for addressing unit cells, in other embodiments unit cells may be addressed using fewer than three control signals or more than three control signals. The number of control signals is generally based on an architecture of the detector array and/or the readout circuit.

A sequence of operations of the circuit 400 is described with additional reference to FIG. 5, which illustrates the example timing diagram 500 for the selection circuit of FIG. 4 for facilitating readout of the detector string 405 (e.g., readout of a detector array that includes the detector string 405) in accordance with one or more embodiments of the present disclosure. The timing diagram 500 provides a normal signal pattern sequence for the selection circuit associated with each of the detectors of the detector string 405. In an aspect, the normal signal pattern sequence refers to a state (e.g., logic high, logic low) of the control signals $EN_x$ for x=0, 1, 2, ..., and N and $BS_x$ and $SEL_x$ for x=1, 2, ..., and N as a function of time during normal operation, in which each row of detectors is read out in a sequential fashion. For explanatory purposes, the detector 405A, 405B, 405C, and 405D are referred to as being in a first row, second row, third row, and $N^{th}$ row of detectors of the detector array that includes the detectors string 405.

With reference to FIGS. 4 and 5, to initialize the detector array and the associated selection circuit for a frame period, the control signals $EN_0$ through $EN_N$ are asserted (e.g., at a logic high) to close the associated switches 420A through 420F and apply the reference voltage $V_{DETCOM}$ to the detectors 405A through 405D, the control signals $BS_1$ through $BS_N$ are asserted to close the associated switches 415A through 415D, and the control signals $SEL_1$ through $SEL_N$ are deasserted (e.g., at a logic low) to open the associated switches 425A through 425E. As shown in FIG.

5, a time t=0 is set to a time at which such initialization occurs. From around a time $t=t_0$ to around a time $t=t_1>t_0$, a global EN signal turn off is performed to transition the control signals $EN_0$ through $EN_N$ to a deasserted state. The control signals $EN_0$ through $EN_N$ are deasserted to open the associated switches 420A through 420F.

The sequence of operations of the circuit 400 then proceeds to facilitate readout of the detector 405A (e.g., facilitate readout of the row of detectors that includes the detector 405A). At around a time $t=t_2>t_1$, the control signal $EN_1$ is asserted to close the switch 420B and the control signal $BS_1$ is deasserted to open the switch 415A. With the switch 420B closed, the detector 405A is coupled to the reference voltage $V_{DETCOM}$. At around a time $t=t_3>t_2$, the control signal $SEL_1$ is asserted to close the switch 425A. With the switches 420B and 425A closed and the switch 415A open (and the remaining switches controlled using their respective control signals as shown in FIG. 5), the detector 405A provides an output signal to circuitry of the ROIC. The output signal may be a detection signal generated based on a radiation detected by the detector 405A. In some cases, the output signal may be a current that flows through the switch 420B, the detector 405A, and the switch 425A.

In an aspect, a time period that extends between around $t_2$ to around $t_5$ may be referred to as an addressing time period (e.g., also referred to simply as an addressing time or an addressing period) for the first row of detectors. An addressing time period may be a period of time associated with addressing a subset of detectors to access and readout image data from the subset of detectors. It is noted that a start time and end time associated with addressing a subset (e.g., row) of detectors is implementation specific, and may encompass an end time associated with addressing a prior subset (e.g., row) and/or a start time associated with addressing a next subset (e.g., row).

In an embodiment, to facilitate readout addressing verification associated with addressing the first row of detectors, the control signals provided to the selection circuit to allow addressing of the first row of detectors, while not addressing the remaining rows of detectors, may be sampled at one or more time instances within the addressing time period. As an example, the verification value generator 285 may sample the control signals $EN_0$ through $EN_N$, $BS_1$ through $BS_N$, and/or $SEL_1$ through $SEL_N$ at around $t=t_{S1}$. In some cases, the control signals $EN_0$ through $EN_N$, $SEL_1$ through $SEL_N$, and $BS_1$ through $BS_N$ may represent digital signals that are used to generate corresponding analog signals appropriate to drive the corresponding switches. In other cases, the control signals $EN_0$ through $EN_N$, $SEL_1$ through $SEL_N$, and $BS_1$ through $BS_N$ may represent the analog signals appropriate to drive the corresponding switches. As such, such sampling may be performed to determine a state or a level (e.g., voltage level) associated with each of the control signals within the addressing time period of the first row. For example, with reference to FIG. 2, for the row 270, the control signals $BS_1$, $EN_1$, and $SEL_1$ may be sampled from the lines 265; for the row 280, the control signals $BS_2$, $EN_2$, and $SEL_2$ may be sampled from the lines 275, and so forth for the remaining rows. These sampled control signals may be used (e.g., by the verification value generator 285) to generate a verification value (e.g., a CRC code) associated with addressing the first row of detectors.

It is noted that the control signals need not be sampled at the same time. For example, $BS_1$ may be sampled earlier (e.g., slightly earlier) or later (e.g., slightly later) than $BS_3$. In some cases, the $BS_1$ through $BS_N$ signals may be substantially simultaneously sampled, then the $EN_0$ through $EN_N$ signals may be substantially simultaneously sampled, and then $SEL_0$ through $SEL_N$ signals may be substantially simultaneously sampled. Other orders and/or manners by which to sample the control signals $EN_0$ through $EN_N$, $BS_1$ through $BS_N$, and/or $SEL_1$ through $SEL_N$ may be utilized so long as these control signals are sampled within the addressing time period for the first row of detectors.

The sequence of operations of the circuit 400 then proceeds to facilitate readout of the detector 405B (e.g., facilitate readout of the row of detectors that includes the detector 405B). At around a time $t=t_4>t_3$, the control signals $EN_1$ and $BS_2$ are deasserted to open the switches 420B and 415B, respectively, to remove (e.g., disconnect, decouple) the reference voltage $V_{DETCOM}$ from the detector 405A and remove the short across the detector 405B. The control signal $EN_2$ is then asserted to close the switch 420C. At around a time $t=t_5>t_4$, the control signal $SEL_1$ is deasserted to open the switch 425A and the control signal $SEL_2$ is asserted to close the switch 425B. With the switch 425A open and the switch 425B closed, the detector 405B can be read out. In this regard, the detector 405B provides a signal (e.g., current flowing through the switch 425B, the detector 405B, and the switch 420C) to circuitry of the ROIC. The detector 405A, with the switch 415A open, functions to isolate the detector 405B from a potential short (e.g., a column-to-column defect) at a node 430.

In an aspect, a time period that extends between around $t_4$ to around $t_7$ may be referred to as an addressing time period for the second row of detectors. In an embodiment, to facilitate readout addressing verification associated with addressing the second row of detectors, the control signals provided to the selection circuit to allow addressing of the second row of detectors, while not addressing the remaining rows of detectors, may be sampled at one or more time instances within the addressing time period. As an example, the verification value generator 285 may sample the control signals $EN_0$ through $EN_N$, $BS_1$ through $BS_N$, and/or $SEL_1$ through $SEL_N$ at around $t=t_{S2}$. These sampled control signals may be used (e.g., by the verification value generator 285) to generate a verification value (e.g., a CRC code) associated with addressing the second row of detectors.

The sequence of operations of the circuit 400 then proceeds to facilitate readout of the detector 405C (e.g., facilitate readout of the row of detectors that includes the detector 405C). At around a time $t=t_6>t_5$, the control signals $EN_2$ and $BS_3$ are deasserted to open the switches 420C and 415C, respectively, and the control signals $EN_3$ and $BS_1$ are asserted to close the switches 420D and 415A, respectively. At around a time $t=t_7>t_6$, the control signal $SEL_2$ is deasserted to open the switch 425B and the control signal $SEL_3$ is asserted to close the switch 425C. With the switch 425B open and the switch 425C closed, the detector 405C can be read out. In this regard, the detector 405C provides a signal (e.g., current flowing through the switch 425C, the detector 405C, and the switch 420D) to circuitry of the ROIC. The detector 405B, with the switch 415B open, functions to isolate the detector 405C from a potential short at the node 430 and/or the contact 410A.

In an aspect, a time period that extends between around $t_6$ to around $t_9$ may be referred to as an addressing time period for the second row of detectors. In an embodiment, to facilitate readout addressing verification associated with addressing the third row of detectors, the control signals provided to the selection circuit to allow addressing of the third row of detectors, while not addressing the remaining rows of detectors, may be sampled at one or more time instances within this addressing time period. As an example, a verification circuit (e.g., the verification value generator 285) may sample the control signals $EN_0$ through $EN_N$, $BS_1$ through $BS_N$, and/or $SEL_1$ through $SEL_N$ at around $t=t_{S3}$. These sampled control signals may be used (e.g., by the verification value generator 285) to generate a verification value (e.g., a CRC code) associated with addressing the third row of detectors.

In a similar manner, other detectors, including the detector 405D, may be selected for readout, for example, row by row in a sequential fashion. In this regard, at around a time $t_{10}$, the detector 405D has been read out and the control signals are deasserted and asserted as appropriate. As such, in FIG. 5, a frame period may be a duration of around $t_{10}$. After $t=t_{10}$ (e.g., after performing readout of the detectors 405A through 405D, including any detectors between the detectors 405C and 405D not explicitly shown in FIG. 4), the detector array and the selection circuit may be initialized for a next frame period. The control signals $EN_0$ through $EN_N$ are reasserted (e.g., as part of a global EN signal turn on), while the control signals $SEL_1$ through $SEL_N$ are in a deasserted state and the control signals $BS_1$ through $BS_N$ are in an asserted state, and thus the timing diagram 500 may be repeated for a next reading (e.g., a next frame) of the detector array. In some embodiments, by closing the switches 415A-D, 420A-F, and 425A-E in this manner, the detrimental parasitic resistance and capacitance characteristics may be minimized and potential defects may be isolated, thus providing improved detector array performance. In an embodiment, to facilitate readout addressing verification associated with addressing each row of detectors, the control signals $BS_0$ through $BS_N$, $EN_1$ through $EN_N$, and/or $SEL_1$ through $SEL_N$ may be sampled within the corresponding address time periods. For example, the control signals may be sampled at around $t=t_{S4}$, around $t=t_{SN-1}$, and around $t=t_{SN}$ for the addressing time periods associated with the fourth row of detectors, $(N-1)^{th}$ row of detectors, and $N^{th}$ row of detectors, respectively, and these sampled control signals may be used (e.g., by the verification value generator 285) to generate a verification value (e.g., a CRC code) associated with addressing the fourth row of detectors, $(N-1)^{th}$ row of detectors, and $N^{th}$ row of detectors, respectively.

In FIG. 5, there are brief non-overlap times when two detectors are enabled. For example, a non-overlap time between the deassertion of the control signal $EN_1$ and the assertion of the control signal $SEL_2$ results in a brief time when both the detectors 405A and 405B are enabled (e.g., current flowing through the switch 425A, the detectors 405A and 405B, and the switch 420C). Similarly, such a non-overlap time is present between the deassertion of the control signal $EN_2$ and the subsequent assertion of the control signal $SEL_3$, between the deassertion of the control signal $EN_3$ and the subsequent assertion of the control signal $SEL_4$, between the deassertion of the control signal $EN_{N-1}$ and the subsequent assertion of the control signal $SEL_N$, and so forth. It is noted that FIG. 5 illustrates a timing diagram associated with one example implementation, and that other implementations might not include a time duration when two detectors are enabled. It is further noted that a start time and end time associated with addressing a subset (e.g., a row) of detectors is implementation specific, and may overlap with an end time associated with addressing a previous subset of detectors and/or a start time associated with addressing a next subset of detectors.

In an aspect, specific switching schemes (e.g., timing of on or off state of each switch) associated with the selection circuit of the circuit 400 shown in FIG. 4 and the timing diagram 500 shown in FIG. 5 may facilitate reduced sensitivity to defects (e.g., column-to-column short defect), less noise, less crosstalk, and/or reduced parasitic capacitance within the FPA. In some cases, a previously read out detector and its associated portion of the selection circuit may be used to isolate a detector that currently being read out.

Thus, using various embodiments, readout addressing verification is performed to verify an integrity of addressed data. Such readout addressing verification may provide assurance that a subset (e.g., a row) of pixel data output from an ROIC is the subset of pixel data expected by an imaging system (e.g., according to a system clock and/or synchronization signal). Such readout addressing verification may also detect if output pixel data in a subset (e.g., a row) may have been adversely affected by an error associated with the control signals, such as a reduction in image quality due to multiple subsets (e.g., rows) being addressed simultaneously. For some applications, such as functional safety and vehicular (e.g., automotive) applications, readout circuitry coupled to or otherwise equipped with such verification functionality may be associated with higher functional safety ratings. In some aspects, readout addressing verification may directly address safety concerns that image data output from an ROIC is a correct image in time by verifying the control signals used to address a subset of detectors and not address remaining subsets of detectors. In some cases, a verification value and comparison of the verification value to a predetermined value may be performed nearly simultaneously with readout of the image data. Such readout addressing verification allows row order and state of signal addressing (e.g., digital signal addressing) of an FPA (e.g., a bolometer array) to be verified during imaging operation. When digital control signals are sampled (e.g., the control signals $EN_0$ through $EN_N$, $SEL_1$ through $SEL_N$, and $BS_1$ through $BS_N$ represent digital control signals), various embodiments address safety concerns that the image data output from the ROIC by verifying digital control signals as close as possible to an analog signal chain addressing the FPA. In some embodiments, by verifying the digital control signals as close as possible to the analog signal chain, signal integrity is verified at the point the digital control signals are received rather than the point that the digital control signals are generated.

Figure 6:
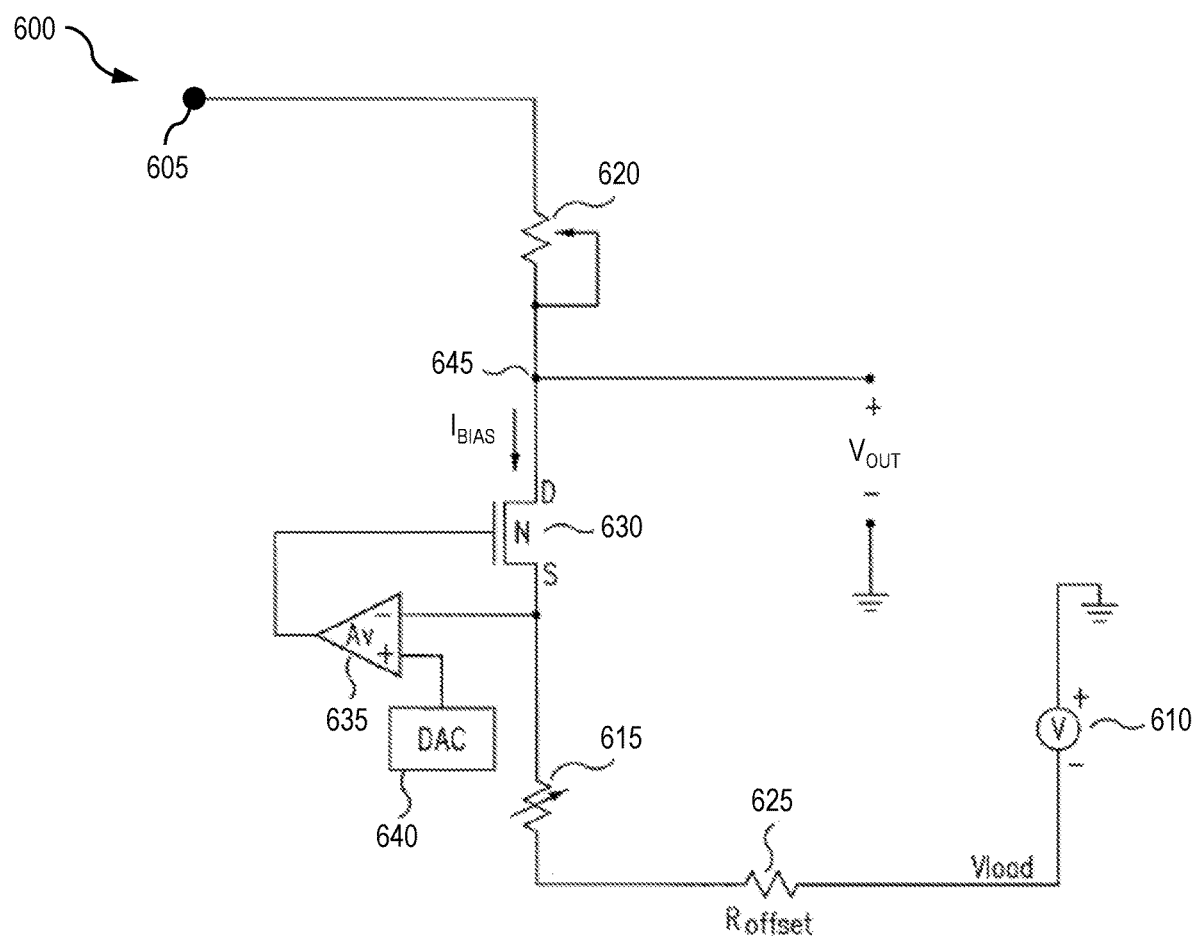
FIG. 6 illustrates a circuit associated with a readout circuit in accordance with one or more embodiments of the present disclosure.

FIG. 6 illustrates a circuit 600 associated with a readout circuit (e.g., ROIC) in accordance with one or more embodiments. In an embodiment, the circuit 600 is coupled to the selection circuit and the detector array that includes the detector string 405 of FIG. 4, and the detector array is a microbolometer array. In this regard, a node 605 may be connected to the node 435 of FIG. 4. In some cases, the circuit 600 provides temperature compensation for the detector array. It is noted that, in other embodiments and as would be understood by one skilled in the art, the circuit 600 may be associated with readout of other detector arrays, and/or a different circuit from the circuit 600 may be associated with readout of other detector arrays. For explanatory purposes, the detector array is a microbolometer array. However, the detector array may include other types of infrared detector arrays (e.g., thermal infrared detector arrays, infrared detector arrays outside of the thermal infrared spectrum) or detector arrays associated with wavelengths outside of the infrared spectrum.

The circuit 600 includes a supply voltage 610, a thermally-shorted microbolometer 615, resistors 620 and 625, a transistor 630, an amplifier 635, and a DAC 640. The supply voltage 610 may provide the reference voltage $V_{DETCOM}$. In some aspects, the circuit 600 provides substrate temperature compensation and temperature coefficient of resistance (TCR) mismatch compensation for the detector array.

An active microbolometer (e.g., one of the detectors 405A-D or other detector) of the microbolometer array may be a thermally-isolated microbolometer, selected from the circuit 400 as provided above, that receives incident infrared radiation. The active microbolometer is biased by the reference voltage $V_{DETCOM}$ and a load current $I_{BIAS}$. The amplifier 635 provides a gate bias to the transistor 630, while the DAC 640 is used to set an amplifier reference voltage and control the amplifier 635 to set the appropriate gate bias for the transistor 630. Alternatively, the amplifier 635 can be eliminated and the DAC 640 used to set the appropriate gate bias directly for the transistor 630. A load circuit or bias circuit includes the supply voltage 610, the resistor 625, the microbolometer 615 (e.g., thermally shorted (to the substrate) load microbolometer), the transistor 630, and the amplifier 635 with the DAC 640, which are used to establish the load current $I_{BIAS}$.

The microbolometer 615 is used as a substrate temperature compensated load. The supply voltage 610 is set to optimize an operating point for the circuit 600 by setting a nominal voltage drop across the microbolometer 615. An output voltage $V_{OUT}$ of the circuit 600 is provided at a node 645. In some cases, the output voltage $V_{OUT}$ may be translated, amplified, or converted by amplification or integration processes and/or other signal processing techniques. For example, an amplifier may amplify a voltage at the node 645 to provide the output voltage $V_{OUT}$.

As incident infrared radiation levels increase, the temperature of the active microbolometer (e.g., one of the detectors of the detector string 405) increases. The temperature increase lowers the active microbolometer's resistance and reduces the voltage drop across the active microbolometer, and thus increases the voltage level at the drain terminal of the transistor 630 (i.e., at the node 645). The change in the voltage drop across the active microbolometer causes a change in the output voltage $V_{OUT}$. As such, an increase or a decrease in incident infrared radiation levels is reflected by an increase or a decrease, respectively, in the voltage level of the output voltage $V_{OUT}$.

The supply voltage 610 is used to adjust the load current and thereby optimize the operating point of the circuit 600 by setting the output voltage $V_{OUT}$ at a desired point within a range of output circuitry voltage levels. By setting the appropriate gate bias of the transistor 630 and appropriate voltage level of the supply voltage 610, the output voltage $V_{OUT}$ is adjusted. For example, the supply voltage 610 may be a single voltage level set for the entire array of microbolometers. The amplifier 635 and the DAC 640 may then be used to supply a unique voltage bias to each corresponding thermally-shorted microbolometer 615 in the FPA to provide a fine adjustment or offset to the load voltage or the load current $I_{BIAS}$. This corrects for the individual offset errors in the output signals from each of the thermally-isolated microbolometers (e.g., the active microbolometers). By adjusting the offset for each microbolometer circuit, the nominal output voltage level of the output voltage $V_{OUT}$ for each circuit is adjusted to fall within a desired range.

In an aspect, the resistors 620 and 625 may be used to address a relative mismatch in the TCR between the active microbolometer and the microbolometer 615 (e.g., the load microbolometer). The resistor 620 is a variable resistor to provide adjustments (e.g., fine adjustments) to the composite TCR value of the active microbolometer portion of the circuit relative to the load microbolometer portion of the circuit. The resistor 625 provides an adjustment (e.g., coarse adjustment) for the circuit 600. Thus, by setting the resistor 620, temperature compensation may be provided for the mismatch in relative TCR between the active microbolometer and the load microbolometer. In this regard, for the voltage divider network of resistors, the resistor 620 adjusts the composite TCR of the active microbolometer and the resistor 620 relative to the microbolometer 615 and the resistor 625. As an example, circuit values for these circuit elements may be in the range of around 50 kΩ to around 200 kΩ and around 150 kΩ to around 600 kΩ for the active microbolometer and the microbolometer 615, respectively. Example circuit values for the resistors 620 and 625 may, for example, vary within around 0Ω to around 10 kΩ and vary within around 0Ω to around 30 kΩ, respectively, but these ranges are not limiting and may vary over wider ranges of values.

The resistors 620 and 625 are typically resistors having a different TCR (e.g., generally lower) than their corresponding microbolometers (e.g., the active microbolometer and the microbolometer 615). For example, the resistor 620 may have a low TCR and the active microbolometer may have a higher TCR relative to the microbolometer 615. By the proper selection of the resistance value of the resistor 620, the combination of the resistor 620 and the active microbolometer provides a TCR that is closer to the TCR of the microbolometer 615 (or the TCR of the combination of the microbolometer 615 and the resistor 625 if the resistor 625 is present) than is the TCR of solely the active microbolometer. Therefore, the performance and behavior of each microbolometer within the array is vastly improved over a range of substrate temperatures.

While FIGS. 4-6 illustrate portions of circuitry an FPA and a timing diagram associated with readout of the FPA's detector array, it is noted that such circuitry and timing diagram are provided by way of non-limiting example. Different architectures (and associated timing diagram) can be utilized to implement the circuitry of the FPA, such as different architectures of the detector array, the selection circuit of the readout circuit, and/or other components of the FPA. Additional examples of circuitry of the FPA and associated timing diagrams are provided for example in U.S. Pat. No. 7,679,048, which is incorporated herein by reference in its entirety.

Figure 7:
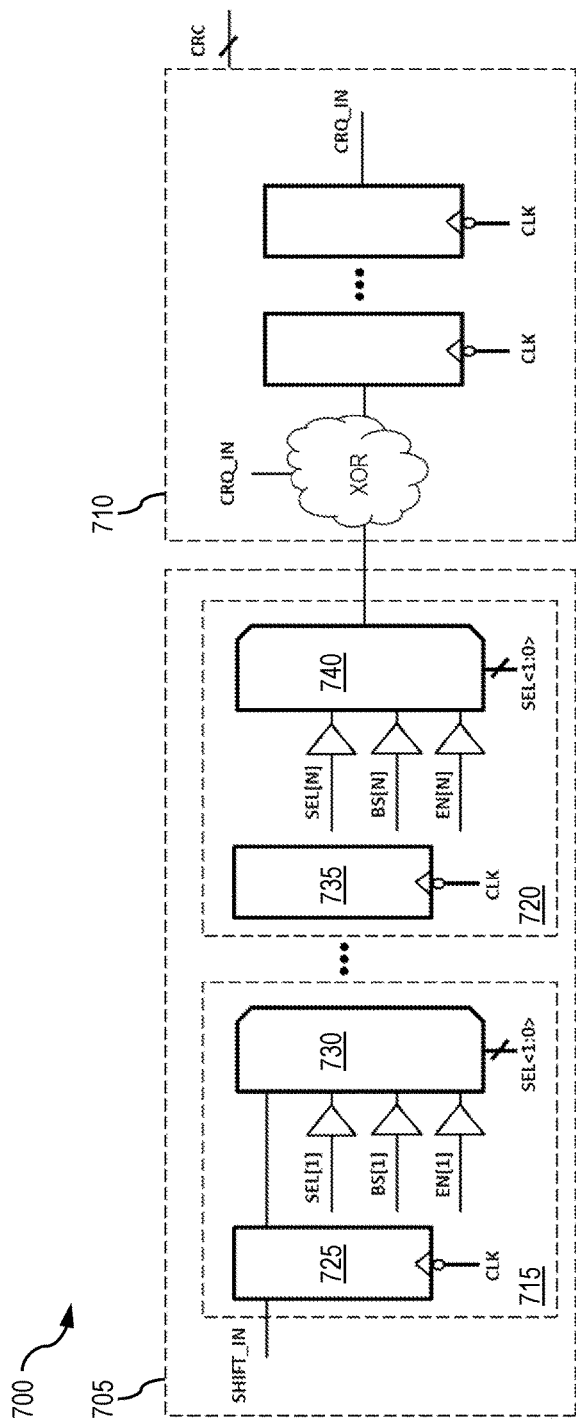
FIG. 7 illustrates an example verification value generator in accordance with one or more embodiments of the present disclosure.

FIG. 7 illustrates an example verification value generator 700 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The verification value generator 700 includes a parallel-in/serial-out (PISO) scan shift register 705 and a CRC circuit 710. During a time period associated with addressing a subset of detectors of an FPA, one group of row addressing control busses may be sampled at a time. Each row addressing control bus may be associated with a type of control signal. For example, for the row 270, the lines 265 may include a row addressing control bus for carrying the control signal SEL[1], a row addressing control bus for carrying the control signal BS[1], and a row addressing control bus for carrying the control signal EN[1].

The PISO scan shift register 705 includes N register elements (e.g., one register element for each subset of detectors), of which register elements 715 and 720 are shown in FIG. 7. In one example, the FPA may have N=518 rows of unit cells (e.g., 512 rows of active unit cells and 6 rows of reference unit cells). The register element 715 includes a storage element 725 and a multiplexer 730 (e.g., a 4:1 multiplexer). The multiplexer 730 may selectively provide the control signal SEL[1], BS[1], or EN[1] to the CRC circuit 710. The register element 720 includes a storage element 735 and a multiplexer 740 (e.g., a 4:1 multiplexer). The multiplexer 740 may selectively provide the control signal SEL[N], BS[N], or EN[N] to the CRC circuit 710. In some cases, the storage elements 725 and 735 are D flip-flops.

As a non-limiting example of providing the control signals to the CRC circuit 710, the PISO scan shift register 705 may sample the control signals SEL[1] through SEL[N], followed by sampling the control signals BS[1] through BS[N], and then followed by sampling the control signals EN[1] through EN[N]. In this regard, for the example with N=518 rows of unit cells, the PISO scan shift register 705 may provide the 518 SEL control signals, the 518 BS control signals, and the 518 EN control signals to the CRC circuit 710. For a first group of control signals (e.g., the control signals SEL[1] through SEL[N]), the row addressing control busses may be sampled as a parallel load into the PISO scan shift register 705 and then serially shifted out to the CRC circuit 710. In an aspect, while shifting the sampled data out, a high level or low level may be shifted serially in to the PISO scan shift register that aligns with a logical state of a majority of a next group of row addressing control busses to be sampled. This serial shifting in phase may be done to reduce or eliminate large current surfaces for large parallel digital events. This process of shifting in the sampled row addressing control busses may continue for the next two groups of control signals (e.g., the control signals BS[1] through BS[N] and then the control signals EN[1] through EN[N]).

The CRC circuit 710 may generate a CRC code (e.g., to be used as a verification value to facilitate readout addressing verification) based on the three groups of control signals. In an aspect, the verification value generator 700 may be considered to package these 1,554 control signals (e.g., represented by 1,554 bits with 1 for logic high and 0 for logic low) into a CRC code of a certain length. As one non-limiting example, the CRC code may have a length of 13 bits. The above manner for providing the control signals to the CRC circuit 710 is provided by way of non-limiting example, and other manners by which to provide the 1,554 control signals to the CRC circuit 710 may be utilized. The CRC circuit 710 may provide a digital error checking code generator used to verify integrity of the control signals. In some cases, the CRC code is calculated through a polynomial division.

In some aspects, error detection capabilities associated a CRC code may be based on a CRC length of the CRC code and a CRC polynomial associated with the CRC code. A CRC polynomial used by the CRC circuit 710 in various embodiments may allow generation of a unique CRC code for each row. In some cases, a CRC polynomial may be selected for use by the CRC circuit 710 from tables that provide different CRC polynomials for various CRC lengths and undetected bit errors. Based on an input length, Hamming weights and undetected bit errors may be used to select an appropriate CRC length and CRC polynomial. In some cases, a CRC code may be used to detect all 1-bit errors. In some cases, for detection of multiple bit errors, corresponding Hamming weights may be checked and the number of undetected bits in the specific errors may be determined based on the Hamming weights. If a calculated CRC code is different from the predetermined CRC code (e.g., the CRC code in a look-up table), data corruption is present. If the calculated CRC code is the same as the predetermined CRC code, the Hamming weights and the number of bit errors may be used to determine whether data corruption is or is not present.

It is noted that, in some cases, such as for the verification value generator 700, the number of control signals for the FPA is divisible such that each register element is associated with three (or other number of) control signals. In other cases, the number of control signals may not be evenly divisible. For example, with reference to FIGS. 4 and 5, if EN[1] of FIG. 7 corresponds to $EN_1$, SEL[1] of FIG. 7 corresponds to $SEL_1$, and so forth for the remaining control signals, the control signals of FIGS. 4 and 5 include an additional $EN_0$ signal relative to the control signals shown in FIG. 7. The architecture shown in FIG. 7 may be adjusted accordingly and/or a different architecture may be utilized to accommodate the additional $EN_0$ signal. It is further noted that the verification value generator 700 provides one example architecture for generating a verification value to facilitate readout addressing verification. Other verification value generators may be used to generate a CRC-based verification value or other type of verification value (e.g., non-CRC-based verification value). In this regard, a verification value may generally be any value that can be generated (e.g., through any desired/appropriate means) based on control signals applied to the FPA during an addressing time period and, similarly, a predetermined value for comparison with the verification value may be any value that can be generated based on control signals expected to be applied to the FPA during the addressing time period.

Figure 8:
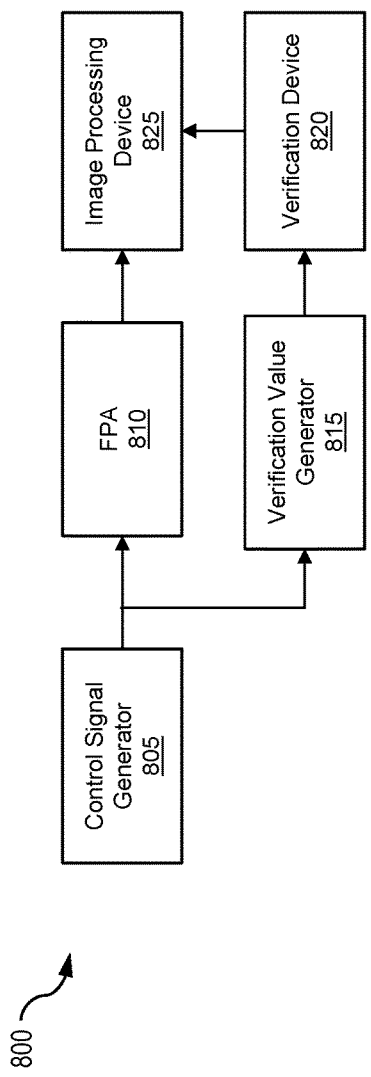
FIG. 8 illustrates an example system for facilitating readout addressing verification in accordance with one or more embodiments of the present disclosure.

FIG. 8 illustrates an example system 800 for facilitating readout addressing verification in accordance with one or more embodiments of the present disclosure. The system 800 includes a control signal generator 805, an FPA 810, a verification value generator 815, a verification device 820, and an image processing device 825. The FPA 810 includes a detector array, an ROIC, and a selection circuit to selectively couple the detector array to the ROIC. In an embodiment, the FPA 810 may be, may include, or may be a part of, the unit cell array 205. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

Figure 9:
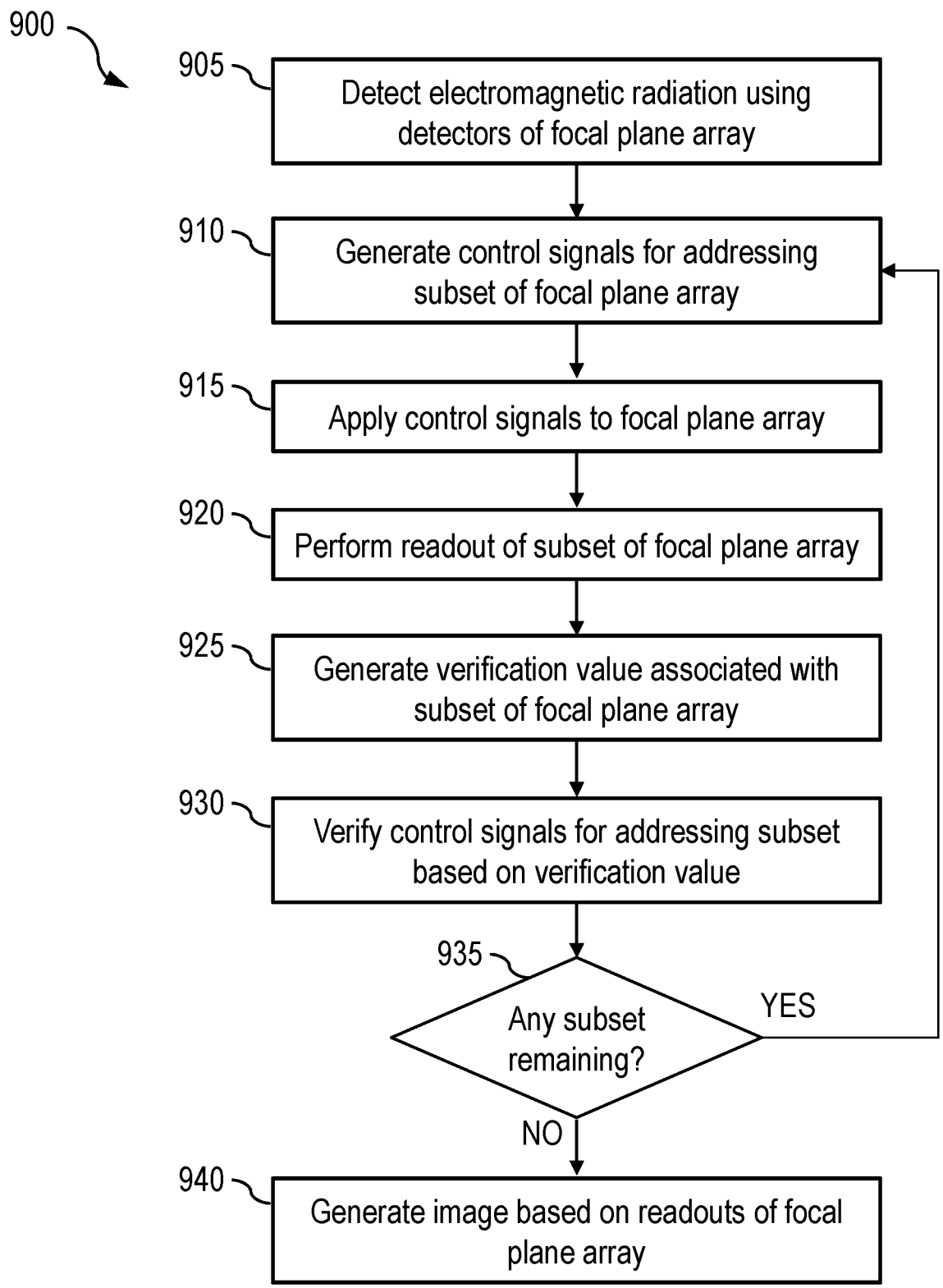
FIG. 9 illustrates a flow diagram of an example process for facilitating readout addressing verification using the system of FIG. 8 in accordance with one or more embodiments of the present disclosure.

FIG. 9 illustrates a flow diagram of an example process 900 for facilitating readout addressing verification using the system 800 of FIG. 8 in accordance with one or more embodiments of the present disclosure. Although the process 900 is primarily described herein with reference to the system 800 of FIG. 8 for explanatory purposes, the process 900 can be performed in relation to other systems for facilitating readout addressing verification. Note that one or more operations in FIG. 9 may be combined, omitted, and/or performed in a different order as desired.

At block 905, the detector array of the FPA 810 detects electromagnetic radiation. In an aspect, the detector array is an infrared detector array (e.g., microbolometer array) that detects IR radiation (e.g., thermal IR radiation). In an embodiment, the FPA 810 may be implemented by the imaging capture component 115.

At block 910, the control signal generator 805 generates control signals for addressing a subset (e.g., a row) of unit cells of the FPA 810. The subset of unit cells of the FPA 810 may be associated with an addressing time period. In an embodiment, the control signal generator 805 may be implemented by the control bias and timing circuitry 235. The control signals may include control signals for selecting/addressing unit cells of the FPA 810 (e.g., for readout). For example, in FIGS. 4 and 5, the control signals may include $EN_0$ through $EN_N$, $BS_1$ through $BS_N$, and $SEL_1$ through $SEL_N$. In an embodiment, the control signal generator 805 may be, may include, or may be a part of, the control bias and timing circuitry 235.

At block 915, the control signal generator 805 applies the control signals generated at block 910 to the FPA 810. These control signals may be used to address the subset of the FPA 810 and not address remaining subsets of the FPA 810. In some cases, the control signals may be analog signals that are at an appropriate logic high level or appropriate logic low level to cause switches of a selection circuit of the FPA 810 to turn on or turn off. In some cases, the control signals may be digital control signals (e.g., bits) that may then be used (e.g., by the FPA 810) to derive the appropriate logic high level or appropriate logic low level.

At block 920, the readout circuit of the FPA 810 performs a readout of the subset of unit cells of the FPA 810 to obtain output signals. In an aspect, the control signals applied at block 915 turns switches of the selection circuit of the FPA 810 on and off as appropriate to allow readout of detection signals generated by the detectors of the subset of unit cells. For a given detector, the detection signal (e.g., detection voltages, detection currents) may be generated based on the electromagnetic radiation detected at block 905.

At block 925, the verification value generator 815 generates, based on the control signals, a verification value associated with the subset of unit cells of the FPA 810. In an aspect, the verification value generator 815 may sample control lines that provide the control signals to the unit cells of the FPA 810 to obtain the control signals. For example, in FIG. 5, the control signals for the subset of unit cells of the FPA 810 may be sampled at around $t=t_{S1}$. The verification value may be a verification bit(s). In an aspect, the verification value may be a CRC code. As an example, if the FPA 810 has 512 rows of unit cells and is addressed row-by-row using three control signals per row (e.g., BS, EN, SEL), the verification value generator 815 may generate each verification value based on the 1,536 control signals. As another example, if the FPA 810 is associated with FIGS. 4 and 5, the verification value generator 815 may generate each verification value based on the 1,537 control signals (e.g., three control signals per row plus the additional $EN_0$ signal). In an embodiment, the verification value generator 815 may be, may include, or may be a part of, the verification value generator 285 of FIG. 2 and/or the verification value generator 700 of FIG. 7.

In some aspects, the verification device 820 may receive the verification values as part of an output of the FPA 810 and/or the image processing device 825. For example, a data stream (e.g., bit stream) associated with a readout of a row of the FPA 810 may include an output (e.g., image pixel data) from unit cells of the row and a verification value (e.g., an output CRC code) associated with addressing the row. A readout of a next row of the FPA 810 may then follow. In other aspects, the verification device 820 may receive the verification values from the verification value generator 815. In some cases, the verification device 820 may be off chip from the FPA 810 and/or other components and used to perform an off chip comparison of the verification value generated by the verification value generator 815 for a given addressed subset with the corresponding predetermined value associated with that addressed subset.

At block 930, the verification device 820 verifies the control signals based on the verification value. Verification of the control signals may determine whether the desired subset (e.g., row) of unit cells of the FPA 810 associated with the addressing time period is addressed. In an aspect, such a determination may also involve determining whether the remaining subsets (e.g., all other rows) of unit cells are not addressed. In such an aspect, the verification device 820 determines whether one and only one subset (e.g., row) of unit cells is being addressed. In an embodiment, to verify the control signals, the verification device 820 may compare the verification value to a predetermined value (e.g., an expected value) associated with the addressing time period. In an aspect, the predetermined value may be stored in a look up table. In an embodiment, such verifying/monitoring of the control signals allows determining that a correct subset of detectors is addressed at a given time (e.g., according to a system clock and/or synchronization signal) and that at the given time one, and only one, subset of detectors is addressed.

If there are additional subsets of unit cells of the FPA 810 to be addressed, the process 900 proceeds from block 935 to block 910. Blocks 910, 915, 920, 925, and 930 may be performed on a next subset of unit cells of the FPA 810 to allow readout and readout addressing verification associated with the next subset of unit cells of the FPA 810. Each iteration of blocks 910, 915, 920, 925, and 930 may be associated with a respective addressing time period (e.g., and an associated LSYNC signal in some cases). Blocks 910, 915, and 920 are performed within an addressing time period for the subset of unit cells of the FPA 810. In some cases, blocks 925 and 930 may occur within the addressing time period, such as to facilitate live verification (e.g., near real time verification) of the control signals.

In this regard, for each addressing time period (e.g., each row addressing time period), the control signal generator 805 may generate and apply a respective set of control signals to the unit cells of the FPA 810 such that a subset (e.g., row) of unit cells associated with the addressing time period is addressed and the remaining unit cells of the FPA 810 are not addressed. Such addressing of the subset of unit cells may allow the readout circuit of the FPA 810 access and readout of the image data captured by a detector of these unit cells. The verification value generator 815 may generate a verification value associated with the subset of unit cells based on the control signals. The verification device 820 may verify the control signals for addressing the subset of unit cells based on the verification value associated with the subset. In an aspect, each subset of unit cells of the FPA 810 may be a row of the FPA 810 such that the FPA 810 is addressed row by row for readout. In an aspect, a look-up table may include predetermined values (e.g., predetermined CRC codes) for each subset (e.g., each row) provided by a factory and stored in the system 800 (e.g., in the memory component 110).

If all subsets (e.g., all rows) of unit cells of the FPA 810 have been addressed, the process 900 proceeds from block 935 to block 940. At block 940, the image processing device 825 generates an image based on the readouts of the FPA 810 performed at various iterations of block 920. The image may be provided to one or more components downstream of the image processing device 825, such as for display, storage, and/or further processing. In some aspects, the image processing device 825 may receive data from the verification device 820 and/or other components about readout addressing verification. In some cases, when the data indicates an error in the readout addressing verification, the image processing device 825 may be used to output an error state along with or in place of an image and/or otherwise alert the user of an error in the readout addressing verification. In an embodiment, after a frame period (e.g., an amount of time to capture a frame), the process 900 has been performed for all subsets of unit cells of the FPA 810 to allow readout accessing verification associated with addressing each addressable subset of unit cells of the FPA 810.

In some aspects, a user of the FPA 810 (e.g., a camera including the FPA 810) may be alerted of an error in the control signals, such that the user may troubleshoot and/or perform mitigation actions (e.g., reset the camera that includes the FPA 810, power cycle the camera, replace the camera). In some cases, the user may be alerted by a signal from the verification device 820 or other device. The verification device 820 may generate a signal (e.g., a single flag bit or multiple bits) indicating a result of the verification performed at block 930. The result may be that no readout addressing errors have been detected (e.g., the control signals are free of error). Alternatively, the result may be that one or more errors are present in the control signals.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. An imaging device comprising:
a focal plane array (FPA) comprising:
  a detector array comprising a plurality of detectors, wherein each detector is configured to detect electromagnetic radiation; and
  a readout circuit configured to perform a readout to obtain image data from each of the plurality of detectors; and
a processing circuit comprising a cyclic redundancy check (CRC) circuit, wherein the processing circuit is configured to:
  apply, to the FPA, a first plurality of control signals associated with a readout of a first subset of detectors of the plurality of detectors;
  generate a first verification value based on the first plurality of control signals, wherein the first verification value comprises a CRC code; and
  perform a verification of the first plurality of control signals based at least on the first verification value.

2. The imaging device of claim 1, wherein the processing circuit is configured to perform the verification of the first plurality of control signals based on the first verification value and a predetermined value associated with addressing the first subset of detectors for the readout of the first subset of detectors.

3. The imaging device of claim 2, wherein the processing circuit is configured to perform the verification of the first plurality of control signals by comparing the first verification value to the predetermined value.

4. The imaging device of claim 1, wherein the processing circuit further comprises:
a control signal generator configured to:
  generate the first plurality of control signals; and
  apply each control signal of the first plurality of control signals over a respective one of a plurality of control lines; and
a verification circuit configured to perform the verification of the first plurality of control signals based at least on the first verification value,
wherein the CRC circuit is configured to:
  obtain a plurality of sampled control signals by sampling the plurality of control lines when the first plurality of control signals are applied; and
  generate the first verification value based on the plurality of sampled control signals.

5. The imaging device of claim 1, wherein the processing circuit is configured to apply, during a first time period, the first plurality of control signals to the FPA, and wherein the readout circuit is configured to perform, during the first time period, the readout of the first subset of detectors to obtain the image data from each of the first subset of detectors, and wherein:
the readout circuit is configured to provide a data stream containing the image data and the first verification value, and
the processing circuit is configured to receive the first verification value from the readout circuit.

6. The imaging device of claim 1, wherein each of the first plurality of control signals is associated with a respective one or more detectors of the plurality of detectors, and wherein the processing circuit is configured to perform the verification of the first plurality of control signals to determine whether the first plurality of control signals is associated with addressing the first subset of detectors.

7. The imaging device of claim 1, wherein the processing circuit is configured to perform the verification of the first plurality of control signals to determine whether the first plurality of control signals is associated with addressing the first subset of detectors and associated with not addressing the remaining detectors of the plurality of detectors.

8. The imaging device of claim 1, wherein the processing circuit is further configured to:
apply, to the FPA, a second plurality of control signals associated with a readout of a second subset of detectors of the plurality of detectors;

generate a second verification value based on the second plurality of control signals; and
perform a verification of the second plurality of control signals based on the second verification value and a predetermined value associated with the readout of the second subset of detectors, wherein the first subset of detectors comprises a first row of detectors, and wherein the second subset of detectors comprises a second row of detectors.

9. The imaging device of claim 1, wherein the FPA further comprises a selection circuit configured to selectively couple the detector array to the readout circuit based on the first plurality of control signals.

10. The imaging device of claim 9, wherein the selection circuit comprises a plurality of switches, and wherein each of the plurality of switches is configured to be turned on or turned off by one of the first plurality of control signals.

11. The imaging device of claim 10, wherein the plurality of switches comprises:
a first set of switches, wherein each switch of the first set of switches is configured to selectively short a respective one of the plurality of detectors;
a second set of switches, wherein each switch of the second set of switches is configured to selectively provide a bias signal to a respective one of the plurality of detectors; and
a third set of switches, wherein each switch of the third set of switches is configured to selectively couple a respective one of the plurality of detectors to the readout circuit, wherein each switch of the first set of switches, each switch of the second set of switches, and each switch of the third set of switches comprises a transistor.

12. The imaging device of claim 10, wherein:
the first plurality of control signals comprises a first set of control signals, a second set of control signals, and a third set of control signals; and
the plurality of switches comprises:
a first set of switches, wherein each of the first set of switches is configured to receive one control signal among the first set of control signals;
a second set of switches, wherein each of the second set of switches is configured to receive one control signal among the second set of control signals; and
a third set of switches, wherein each of the third set of switches is configured to receive one control signal among the third set of control signals;
wherein the processing circuit comprises a CRC circuit is configured to:
receive the first set of control signals;
after receiving the first set of control signals, receive the second set of control signals;
after receiving the second set of control signals, receive the third set of control signals; and
generate the first verification value based on the first set of control signals, the second set of control signals, and the third set of control signals.

13. A method comprising:
detecting, by each detector of a plurality of detectors of a focal plane array (FPA), electromagnetic radiation;
applying, to the FPA, a first plurality of control signals associated with addressing a first subset of detectors of the plurality of detectors;
generating, by a cyclic redundancy check (CRC) circuit, a first verification value based on the first plurality of control signals, wherein the first verification value comprises a CRC code; and
performing a verification of the first plurality of control signals based at least on the first verification value.

14. The method of claim 13, wherein the performing is based on the first verification value and a predetermined value associated with addressing the first subset of detectors for a readout of the first subset of detectors, and wherein the performing comprises comparing the first verification value to the predetermined value.

15. The method of claim 13, further comprising:
sampling a plurality of control lines when the first plurality of control signals are applied to obtain a plurality of sampled control signals,
wherein:
the applying comprises applying each control signal of the first plurality of control signals over a respective one of the plurality of control lines; and
the first verification value is generated based on the plurality of sampled control signals.

16. The method of claim 13, wherein the performing the verification comprises determining whether the first plurality of control signals is associated with addressing the first subset of detectors and associated with not addressing the remaining detectors of the plurality of detectors.

17. The method of claim 13, further comprising:
performing, during a first time period, a readout of the first subset of detectors to obtain image data from each of the first subset of detectors, wherein the applying the first plurality of control signals is performed during the first time period;
applying, during a second time period, a second plurality of control signals associated with addressing a second subset of detectors of the plurality of detectors;
performing, during the first time period, a readout of the second subset of detectors to obtain image data from each of the second subset of detectors;
generating a second verification value based on the second plurality of control signals; and
performing a verification of the second plurality of control signals based on the second verification value and a predetermined value associated with the readout of the second subset of detectors.

18. The method of claim 17, wherein the first subset of detectors comprises a first row of detectors, and wherein the second subset of detectors comprises a second row of detectors.

19. The method of claim 13, further comprising:
performing a readout of the first subset of detectors to obtain image data from the first subset of detectors;
for each remaining subset of detectors of the plurality of detectors:
applying, to the FPA, a plurality of control signals associated with addressing a subset of detectors of the plurality of detectors;
generating a verification value based on the plurality of control signals;
performing a verification of the plurality of control signals based at least on the verification value; and
performing a readout of the subset of detectors to obtain image data from the subset of detectors; and
generating an image based at least on the image data from the plurality of detectors.

20. The method of claim 13, wherein the first plurality of control signals comprises a first set of control signals, a second set of control signals, and a third set of control signals, and wherein the method further comprises:

configuring a first plurality of switches of the FPA to selectively short one or more of the plurality of detectors using the first set of control signals;

configuring a second plurality of switches of the FPA to selectively provide a bias signal to one or more of the plurality of detectors using the second set of control signals; and configuring a third plurality of switches of the FPA to selectively couple one or more of the plurality of detectors to a readout circuit of the FPA using the third set of control signals.

* * * * *

UNITED STATES PATENT AND TRADEMARK OFFICE
CERTIFICATE OF CORRECTION

| | |
|---|---|
| PATENT NO. | : 12,155,946 B2 |
| APPLICATION NO. | : 17/970432 |
| DATED | : November 26, 2024 |
| INVENTOR(S) | : Randy J. Hansen and Longxiang Jing |

It is certified that error appears in the above-identified patent and that said Letters Patent is hereby corrected as shown below:

In the Claims

Claim 12, Column 33, Lines 48-49, change "wherein the processing circuit comprises a CRC circuit is configured to:" to --wherein the CRC circuit is configured to:--.

Signed and Sealed this
Twenty-eighth Day of January, 2025

Coke Morgan Stewart
*Acting Director of the United States Patent and Trademark Office*